(12) United States Patent
Wu et al.

(10) Patent No.: US 8,477,493 B2
(45) Date of Patent: Jul. 2, 2013

(54) STORAGE DEVICE FOR TABLET PERSONAL COMPUTER

(75) Inventors: Chun-Che Wu, Taipei (TW); Chun-Nan Su, Taipei (TW); Chih-Hung Lin, Taipei (TW); Chung-Chun Wu, Taipei (TW)

(73) Assignee: Primax Electronics, Ltd., Taipei (TW)

(*) Notice: Subject to any disclaimer, the term of this patent is extended or adjusted under 35 U.S.C. 154(b) by 185 days.

(21) Appl. No.: 13/193,117

(22) Filed: Jul. 28, 2011

(65) Prior Publication Data

US 2012/0293953 A1 Nov. 22, 2012

(30) Foreign Application Priority Data

May 20, 2011 (TW) .............................. 100117707 A (51) Int. Cl.
*H05K 5/00* (2006.01)
(52) U.S. Cl.
USPC ............ 361/679.56; 361/679.55; 361/679.57; 361/679.58; 361/725; 361/726

(58) Field of Classification Search
USPC ............ 361/679.55, 679.56, 679.58, 679.57, 361/679.43, 679.44, 725–728, 741
See application file for complete search history.

(56) References Cited

U.S. PATENT DOCUMENTS

| | | | | |
|---|---|---|---|---|
| 5,200,913 A * | 4/1993 | Hawkins et al. | ......... | 361/679.09 |
| 5,548,478 A * | 8/1996 | Kumar et al. | ............ | 361/679.27 |
| 6,967,836 B2 * | 11/2005 | Huang et al. | ............. | 361/679.46 |
| 8,248,789 B2 * | 8/2012 | Wu et al. | .................. | 361/679.56 |
| 2008/0304215 A1 * | 12/2008 | Chiu | ............................. | 361/681 |

* cited by examiner

*Primary Examiner* — Tuan T Dinh
*Assistant Examiner* — Hung Dang
(74) *Attorney, Agent, or Firm* — Kirton McConkie; Evan R. Witt (57) ABSTRACT

A storage device for a tablet personal computer is provided. The storage device includes a base and an upper cover for fixing the tablet personal computer. The base includes a foldable structure. When the foldable structure is folded and stacked on a side of the base, a receiving space for fixing a keyboard device is defined by the base and the foldable structure. In such way, the tablet personal computer and the keyboard device can be simultaneously stored within the storage device.

10 Claims, 10 Drawing Sheets

STORAGE DEVICE FOR TABLET PERSONAL COMPUTER

FIELD OF THE INVENTION

The present invention relates to a storage device, and more particularly to a storage device for a tablet personal computer.

BACKGROUND OF THE INVENTION

With increasing development of science and technology, a tablet personal computer has been introduced into the market. The tablet personal computer has a slim appearance similar to the exterior shape of a LCD screen. Moreover, the screen of the tablet personal computer is a touch screen. Via the touch screen, the user may input an instruction into the tablet personal computer to control operations of the tablet personal computer. Generally, when the user wants to input a character or a symbol into the tablet personal computer, an on-screen keyboard is enabled and shown on the touch screen of the tablet personal computer. The on-screen keyboard is a virtual keyboard simulating the real keyboard device. By touching an icon of the on-screen keyboard, a corresponding character or symbol is inputted into the tablet personal computer. In other words, characters or symbols may be directly inputted into the tablet personal computer without any external keyboard device.

Figure 1:
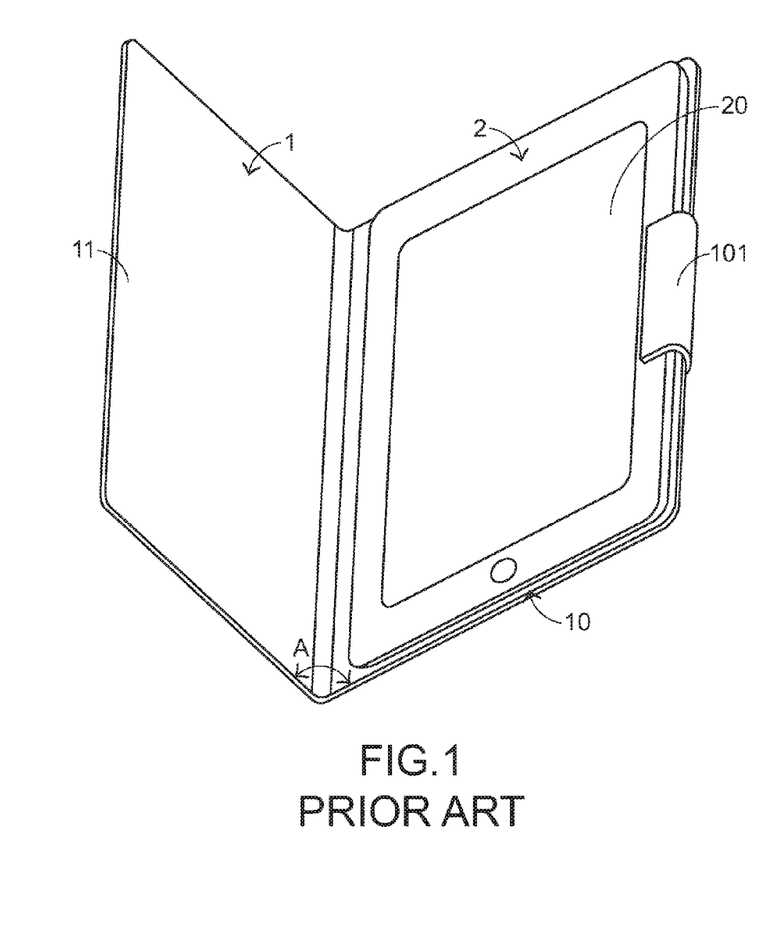
FIG. 1 is a schematic perspective view illustrating a conventional storage device for a tablet personal computer, in which the tablet personal computer is in a usage mode.
Figure 2:
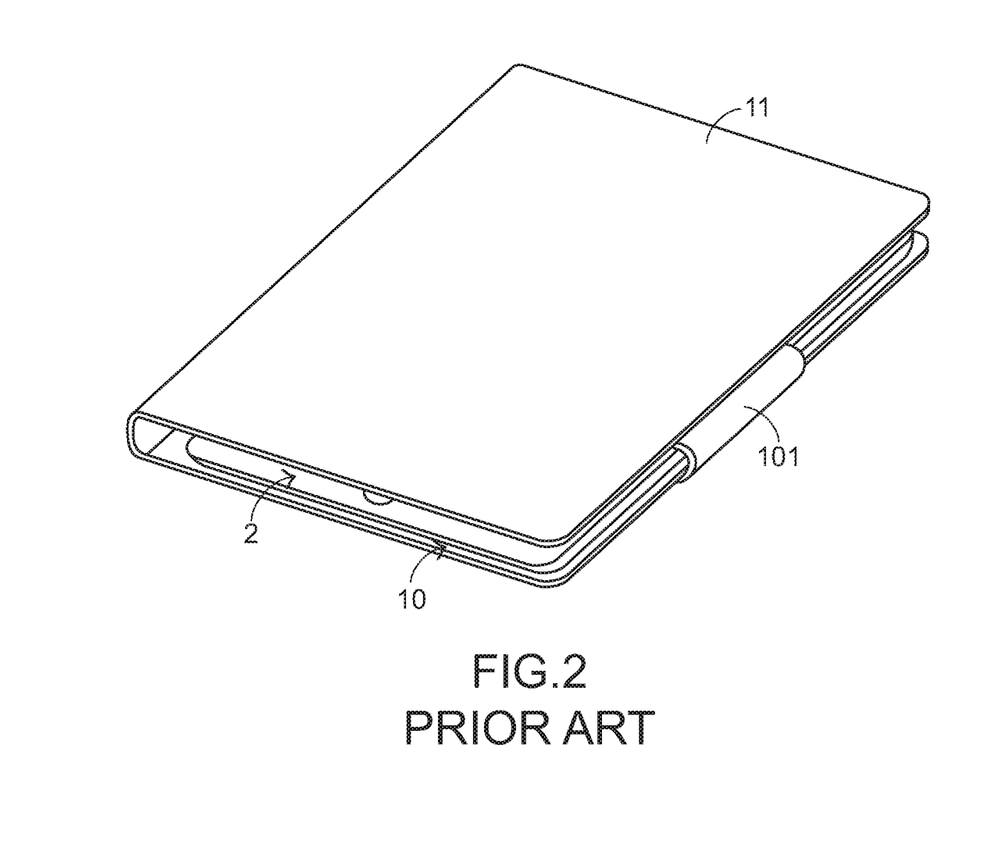
FIG. 2 is a schematic perspective view illustrating a conventional storage device for a tablet personal computer, in which the tablet personal computer is stored within the storage device.

Since the tablet personal computer is equipped with the touch screen, if the touch screen is damaged, the operations of the tablet personal computer fail to be normally handled. That is, it is very important to impart protectiveness to the touch screen. For protecting the tablet personal computer, a storage device for the tablet personal computer is disclosed and commercially available. FIG. 1 is a schematic perspective view illustrating a conventional storage device for a tablet personal computer, in which the tablet personal computer is in a usage mode. The storage device 1 is used for storing the tablet personal computer 2 therein in order to protect the tablet personal computer 2 and a screen 20 of the tablet personal computer 2. As shown in FIG. 1, the storage device 1 comprises a base 10 and an upper cover 11. The base 10 has a fixing hook 101. In a case that the tablet personal computer 2 is placed on the base 10, the tablet personal computer 2 may be fixed on the base 10 via the fixing hook 101. The upper cover 11 is connected with the base 10 and rotatable relative to the base 10. In a case that the upper cover 11 is rotated with the base 10 to define an included angle A between the upper cover 11 and the base 10, as shown in FIG. 1, the tablet personal computer 2 that is fixed on the base 10 can be operated by the user. Whereas, in a case that the upper cover 11 is rotated with the base 10 to cover the base 10, as shown in FIG. 2, the tablet personal computer 2 that is fixed on the base 10 can be covered and protected by the upper cover 11.

Although the tablet personal computer 2 is easily carried because it has a slim appearance and no external keyboard device is needed, there are still some drawbacks. For example, the use of the touch screen to input characters or symbols becomes hindrance for most users who are familiar with the general personal computers or notebook computers. Consequently, in many circumstances, an external keyboard device is additionally prepared and connected to the tablet personal computer 2. In addition, the tablet personal computer 2 is placed and supported on a prop stand (e.g. a bookshelf). That is, the touch screen 20 of the tablet personal computer 2 is usually considered as a general display screen, and the external keyboard device is used for inputting characters or symbols. Generally, the external keyboard device is connected with the tablet personal computer 2 via a universal serial bus (USB) connection. Alternatively, the external keyboard device may be in communication with the tablet personal computer 2 through a wireless transmission module by a wireless transmission technology.

Therefore, there is a need of providing a storage device having the functions of supporting a tablet personal computer and storing the tablet personal computer and a keyboard device, thereby increasing the utilization flexibility of the tablet personal computer.

SUMMARY OF THE INVENTION

The present invention provides a storage device capable of supporting a tablet personal computer and storing the tablet personal computer.

The present invention also provides a storage device capable of simultaneously storing a tablet personal computer and a keyboard device.

In accordance with an aspect of the present invention, there is provided a storage device for supporting a tablet personal computer and storing the tablet personal computer therein. The storage device includes a base and an upper cover. The base has a foldable structure, which is selectively placed on the base to cover the base or folded and stacked on a first side of the base. When the foldable structure is placed on the base to cover the base, a supporting recess is defined by the foldable structure and the base. Whereas, when the foldable structure is folded and stacked on the first side of the base, a receiving space is defined by the foldable structure and the base. The upper cover is connected with the base and rotatable relative to the base, so that the base is covered by the upper cover or an included angle is defined between the upper cover and the base. When the upper cover is rotated relative to the base and the included angle is defined between the upper cover and the base, the tablet personal computer is permitted to be placed in the supporting recess and supported by the upper cover. Wherein, when the base is covered by the upper cover, the tablet personal computer is fixed by the upper cover and stored within the storage device.

In an embodiment, the foldable structure includes a first folding layer, a second folding layer and a third folding layer. The first folding layer is fixed on the first side of the base, and has a first notch. The second folding layer is connected with the first folding layer and foldable relative to the first folding layer, and has a second notch. When the second folding layer is placed on the base, the second notch and the first notch are collectively defined as the supporting recess, and the supporting recess is separated from the receiving space by the second folding layer. Wherein, when the second folding layer is stacked on the first folding layer and located on the first side of the base, the supporting recess is in communication with the receiving space. The third folding layer is connected with the second folding layer and foldable relative to the second folding layer. The third folding layer is selectively placed on the base to cover a second side of the base or stacked on the second folding layer.

In an embodiment, the second folding layer and the third folding layer are integrally formed with the first folding layer.

In an embodiment, the third folding layer includes a first magnetic element. The first magnetic element is located at a second side of the third folding layer. The base further includes a second magnetic element. The second magnetic element is located at the second side of the base. When the first magnetic element and the second magnetic element are magnetically attracted by each other, the third folding layer is fixed on the base.

In an embodiment, the upper cover includes a third magnetic element. The third magnetic element is located at a first side of the upper cover. When the tablet personal computer is magnetically attracted by the third magnetic element, the tablet personal computer is fixed on the upper cover.

In an embodiment, a keyboard device is further in communication with the tablet personal computer for inputting at least one symbol or at least one instruction to the tablet personal computer. The keyboard device is permitted to be stored within the receiving space of the base.

In an embodiment, the keyboard device further includes a fourth magnetic element. The fourth magnetic element is located at a bottom of the keyboard device. When the fourth magnetic element and a second magnetic element of the base are magnetically attracted by each other, the keyboard device is fixed on the base.

In an embodiment, the keyboard device includes a second wireless transmission module. When the second wireless transmission module is in communication with the first wireless transmission module, the at least one symbol or the at least one instruction is transmitted from the second wireless transmission module to the first wireless transmission module.

In an embodiment, the first wireless transmission module and the second wireless transmission module are Bluetooth transmission modules.

In an embodiment, when the tablet personal computer is fixed on the upper cover and the base is covered by the foldable structure, the tablet personal computer is permitted to be stored within the storage device. Whereas, when the foldable structure is folded and stacked on the first side of the base, the keyboard device is permitted to be stored within the receiving space. Wherein, when the tablet personal computer is fixed on the upper cover and the foldable structure is folded and stacked on the first side of the base, the keyboard device is permitted to be stored within the receiving space and the tablet personal computer is permitted to be stored within the storage device.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 3:
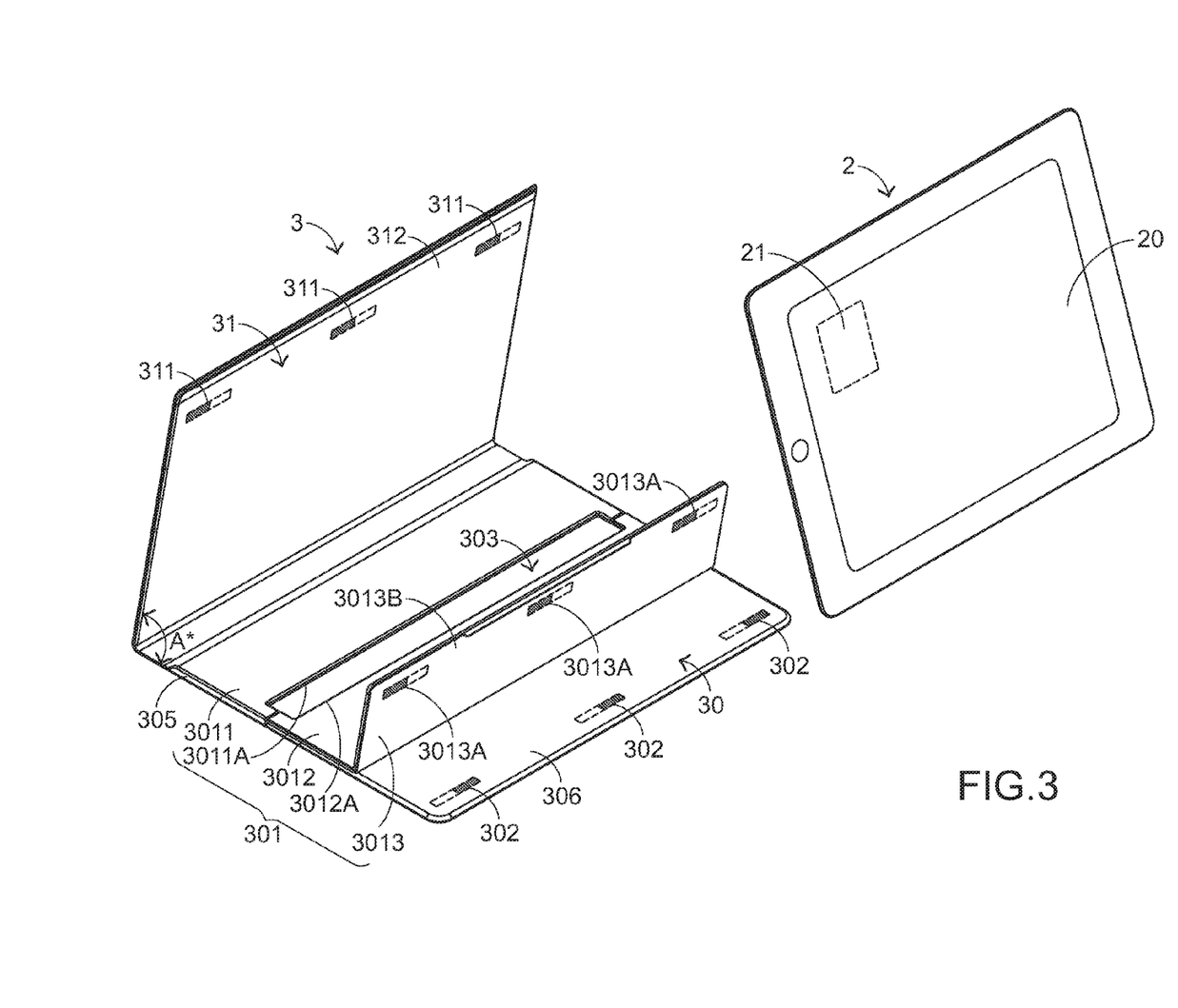
FIG. 3 is a schematic view illustrating a storage device for a tablet personal computer according to an embodiment of the present invention.

For obviating the drawbacks encountered from the prior art, the present invention provides a storage device for a tablet personal computer. The storage device is capable of simultaneously storing a tablet personal computer and a keyboard device therein. FIG. 3 is a schematic view illustrating a storage device for a tablet personal computer according to an embodiment of the present invention. In FIG. 3, a storage device 3 and a tablet personal computer 2 are shown. The configurations and functions of the tablet personal computer 2 are similar to those of the conventional tablet personal computer, and are not redundantly described herein. The tablet personal computer 2 comprises a screen 20 and a first wireless transmission module 21. In this embodiment, the tablet personal computer 2 has a metallic casing, and the first wireless transmission module 21 is a Bluetooth transmission module. The storage device 3 comprises a base 30 and an upper cover 31. The upper cover 31 is connected with the base 30. In addition, the upper cover 31 is rotatable relative to the base 30, so that the base 30 is covered by the upper cover 31 or an included angle A* is defined between the upper cover 31 and the base 30. The upper cover 31 comprises a plurality of third magnetic elements 311. These third magnetic elements 311 are located at a first side 312 of the upper cover 31 for magnetically attracting the metallic casing of the tablet personal computer 2, so that the tablet personal computer 2 can be fixed on the upper cover 31. In this embodiment, the number of the third magnetic elements 311 is three. The left end of each third magnetic element 311 has a magnetic N pole, which is indicated by oblique lines. Whereas, the right end of each third magnetic element 311 has a magnetic S pole.

The base 30 comprises a foldable structure 301 and a plurality of second magnetic elements 302. The foldable structure 301 is selectively placed on the base 30 to cover the base 30. Moreover, the foldable structure 301 may be folded and stacked on a first side 305 of the base 30. These second magnetic elements 302 are located at a second side 306 of the base 30. In this embodiment, the second magnetic elements 302 correspond to respective third magnetic elements 311. That is, the number of the second magnetic elements 302 is also three. In addition, the left end of each second magnetic element 302 has a magnetic S pole, and the right end of each second magnetic element 302 has a magnetic N pole, which is indicated by oblique lines. The foldable structure 301 comprises a first folding layer 3011, a second folding layer 3012 and a third folding layer 3013. The first folding layer 3011 is fixed on the first side 305 of the base 30. In addition, the first folding layer 3011 has a first notch 3011A. The second folding layer 3012 is connected with the first folding layer 3011 and foldable relative to the first folding layer 3011. In addition, the second folding layer 3012 has a second notch 3012A. The third folding layer 3013 is connected with the second folding layer 3012 and foldable relative to the second folding layer 3012. The second folding layer 3012 is selectively placed on the second side 306 of the base 306 to cover the base 306 or stacked on the second folding layer 3012. In this embodiment, the second folding layer 3012 and the third folding layer 3013 are integrally formed with the first folding layer 3011.

Moreover, the third folding layer 3013 comprises a plurality of first magnetic elements 3013A. The first magnetic elements 3013A are located at a second side 3013B of the third folding layer 3013. In a case that the first magnetic elements 3013A are magnetically attracted by the second magnetic elements 302 of the base 30, the third folding layer 3013 is fixed on the base 30. In this embodiment, the first magnetic elements 3013A correspond to respective second magnetic elements 302. That is, the number of the first magnetic elements 3013A is also three. In addition, the left end of each first magnetic element 3013A has a magnetic N pole, and the right end of each first magnetic element 3013A has a magnetic S pole. As shown in FIG. 3, the foldable structure 301 is placed on the base 30 to cover the base 30. That is, the second folding layer 3012 is placed on the base 30, and the third folding layer 3013 is placed on the second side 306 of the base 30. Under this circumstance, the second notch 3012A and the first notch 3011A are collectively defined as a supporting recess 303.

Figure 4:
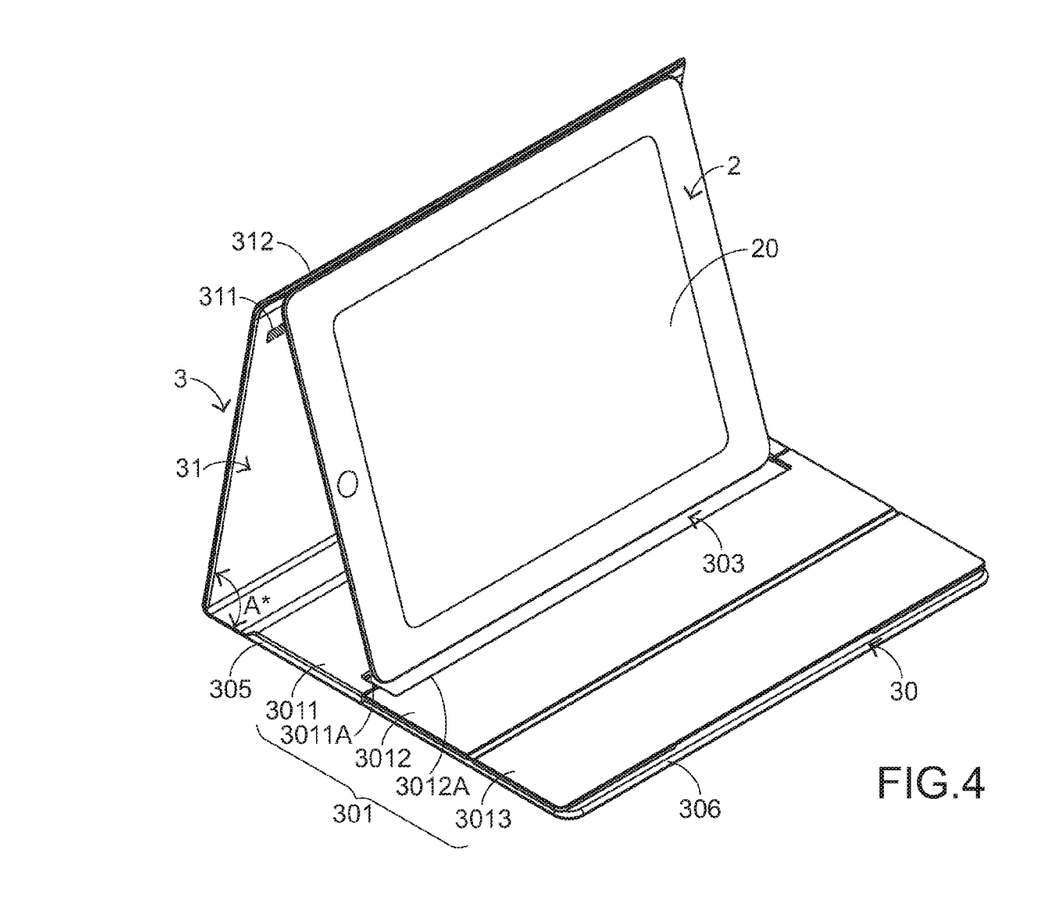
FIG. 4 is a schematic perspective view illustrating a storage device for a tablet personal computer according to an embodiment of the present invention, in which the tablet personal computer is supported by the storage device.

FIG. 4 is a schematic perspective view illustrating a storage device for a tablet personal computer according to an embodiment of the present invention, in which the tablet personal computer is supported by the storage device. In a case that the user wants to operate the tablet personal computer 2 without holding the tablet personal computer 2 by hands, the user may place the second folding layer 3012 and the third folding layer 3013 on the base 30, so that the supporting recess 303 is exposed to the base 30. At the same time, the first magnetic elements 3013A of the third folding layer 3013 are magnetically attracted by the third folding layer 3013, so that the third folding layer 3013 is fixed on the base 30. Under this circumstance, the second folding layer 3012 and the third folding layer 3013 fail to be folded. Then, the tablet personal computer 2 is received within the supporting recess 303 of the base 30, wherein the upper cover 31 is in contact with the tablet personal computer 2. Since the tablet personal computer 2 is magnetically attracted by the third magnetic elements 311 of the upper cover 31, the tablet personal computer 2 is supported by the upper cover. Under this circumstance, the user can easily operate the tablet personal computer 2 without the need of holding the tablet personal computer 2 by hands.

Figure 5:
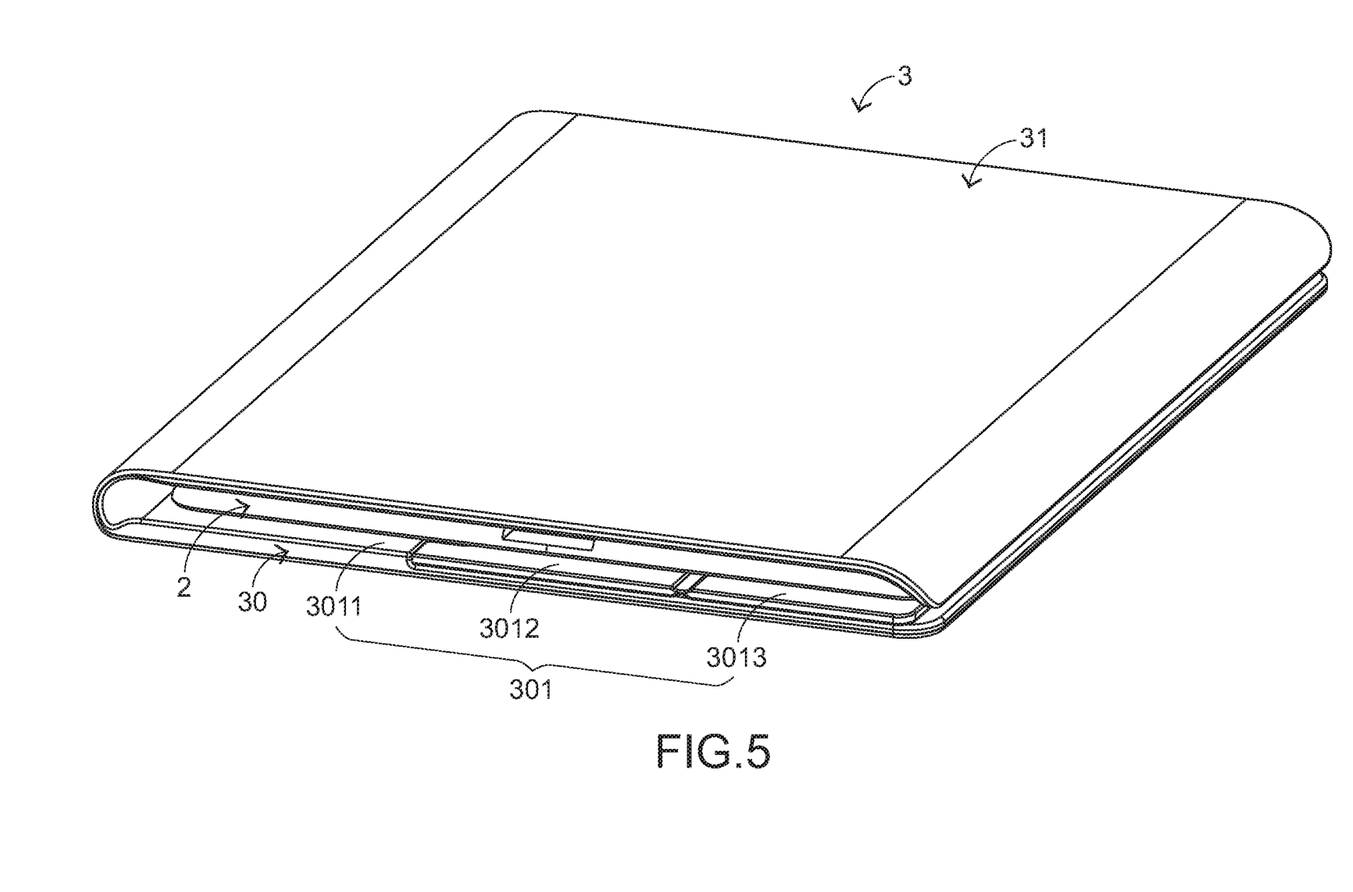
FIG. 5 is a schematic perspective view illustrating a tablet personal computer stored within the storage device according to an embodiment of the present invention.

In a case that the tablet personal computer 2 is in a non-usage mode and the user wants to store the tablet personal computer 2, the tablet personal computer 2 is firstly placed on the upper cover 31. Since the tablet personal computer 2 is magnetically attracted by the third magnetic elements 311 of the upper cover 31, the tablet personal computer 2 is fixed on the upper cover 31. Then, by closing the upper cover 31, the upper cover 31 is rotated relative to the base 30 to cover the base 30. Consequently, the tablet personal computer 2 is stored within the storage device 3. Under this circumstance, the storage device 3 is shaped as a notebook (see FIG. 5). Due to the notebook appearance, the storage device 3 can be easily carried by the user.

Figure 6:
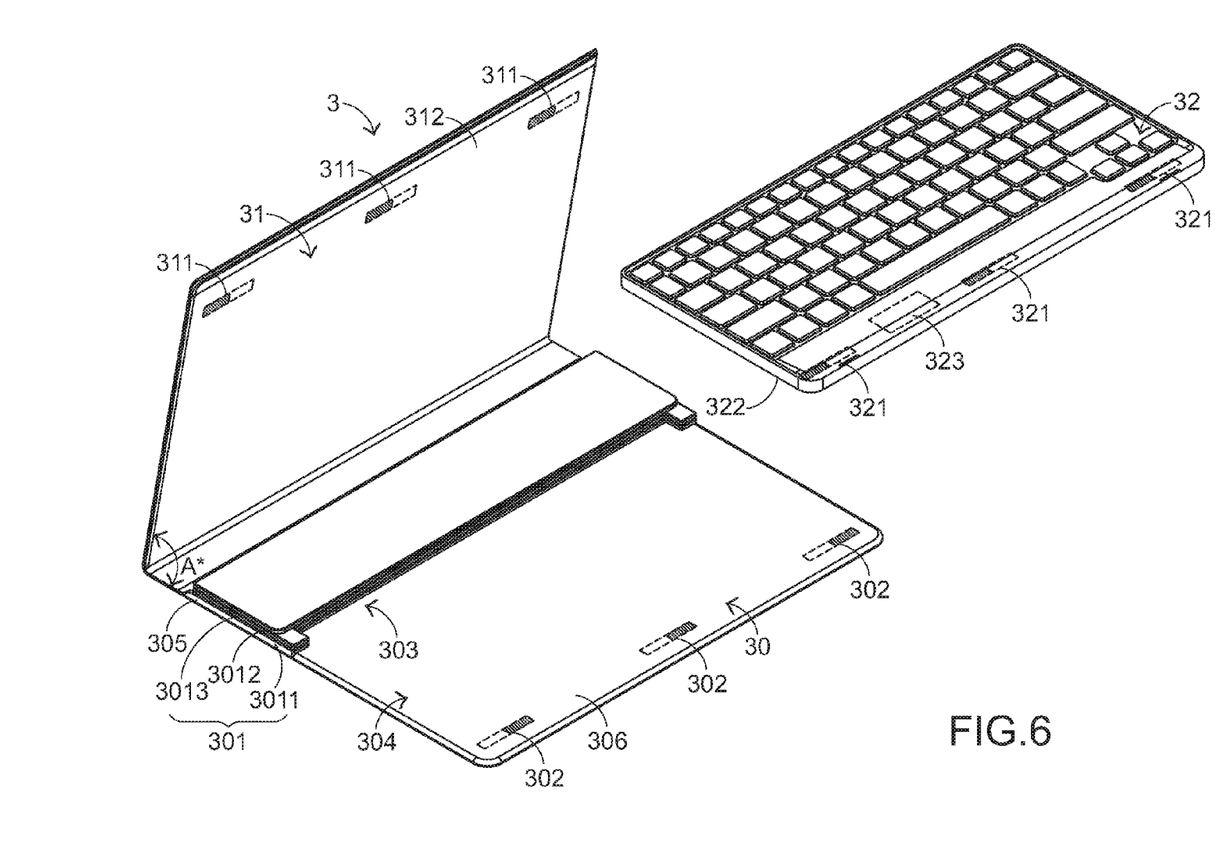
FIG. 6 is a schematic view illustrating a storage device for a tablet personal computer according to an embodiment of the present invention, in which a receiving space is exposed.

FIG. 6 is a schematic view illustrating a storage device for a tablet personal computer according to an embodiment of the present invention, in which a receiving space is exposed. In FIG. 6, a keyboard device 32 and a storage device 3 and shown. The keyboard device 32 comprises a plurality of fourth magnetic elements 321 and a second wireless transmission module 323. These fourth magnetic elements 321 are located at a bottom 322 of the keyboard device 32. In a case that the second magnetic elements 302 and the fourth magnetic elements 321 are magnetically attracted by each other, the keyboard device 32 is fixed on the base 30. In this embodiment, the fourth magnetic elements 321 correspond to respective second magnetic elements 302. That is, the number of the first magnetic elements 3013A is also three. In addition, the left end of each fourth magnetic element 321 has a magnetic N pole, and the right end of each fourth magnetic element 321 has a magnetic S pole. After the second wireless transmission module 323 is in communication with the first wireless transmission module 21 of the tablet personal computer 2, at least one symbol or at least one instruction can be transmitted from the second wireless transmission module 323 to the first wireless transmission module 21. In this embodiment, the second wireless transmission module 323 is also a Bluetooth transmission module.

For using the keyboard device 32 to input instructions or symbols, as shown in FIG. 4, the keyboard device 32 is placed on a desk surface, the storage device 3 is placed on the desk surface, and the tablet personal computer 2 is supported by the storage device 3. Then, the first wireless transmission module 21 of the tablet personal computer 2 is activated, and the first wireless transmission module 21 starts to communicate with the second wireless transmission module 323 of the keyboard device 32. Meanwhile, by operating the keyboard device 32, symbols or instructions can be transmitted to the tablet personal computer 2 through the first wireless transmission module 21 and the second wireless transmission module 323.

Figure 7:
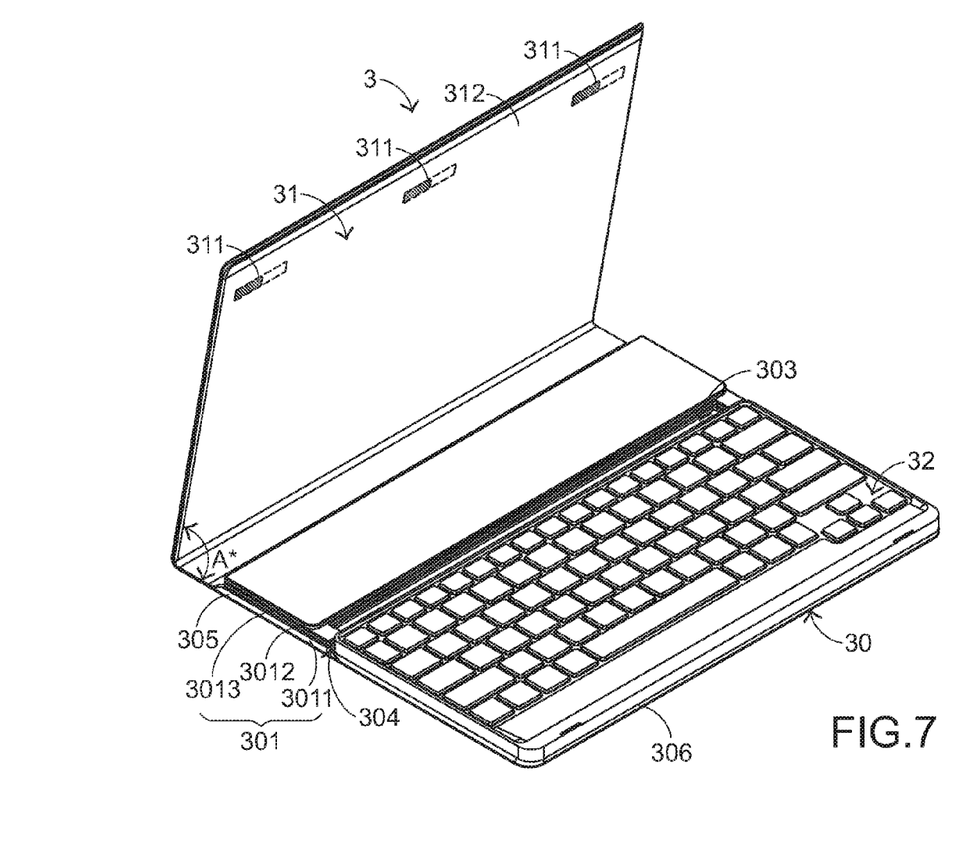
FIG. 7 is a schematic perspective view illustrating a keyboard device fixed on the storage device according to an embodiment of the present invention.

Hereinafter, another operating mode of the storage device 3 will be illustrated with reference to FIG. 6. As shown in FIG. 6, the second folding layer 3012 and the third folding layer 3013 of the foldable structure 301 are folded together, so that the second folding layer 3012 is stacked on the first folding layer 3011 and the third folding layer 3013 is stacked on the second folding layer 3012. Meanwhile, the second folding layer 3012 and the third folding layer 3013 are located at the first side 305 of the base 30. In this situation, a receiving space 304 is defined by the foldable structure 301 and the base 30. The supporting recess 303 of the base 30 is in communication with the receiving space 304. The receiving space 304 is configured to receive the keyboard device 32. After the keyboard device 32 is placed in the receiving space 304, the fourth magnetic elements 321 at the bottom 322 of the keyboard device 32 are magnetically attracted by the second magnetic elements 302 of the base 30. Consequently, the keyboard device 32 is fixed in the receiving space 304 of the base 30 (see FIG. 7). Since the locations of the fourth magnetic elements 321 correspond to the locations of the second magnetic elements 302, the magnetic N poles of the fourth magnetic elements 321 correspond to the magnetic S poles of respective second magnetic element 302, and the magnetic S poles of the fourth magnetic element 321 correspond to the magnetic N poles of respective second magnetic element 302. Due to the magnetic attraction between the fourth magnetic elements 321 and corresponding second magnetic elements 302, the keyboard device 32 can be fixed on the base 30. Moreover, the keyboard device 32 can be precisely fixed in the receiving space 304 without being skewed or out of the range of the base 30.

Figure 8:
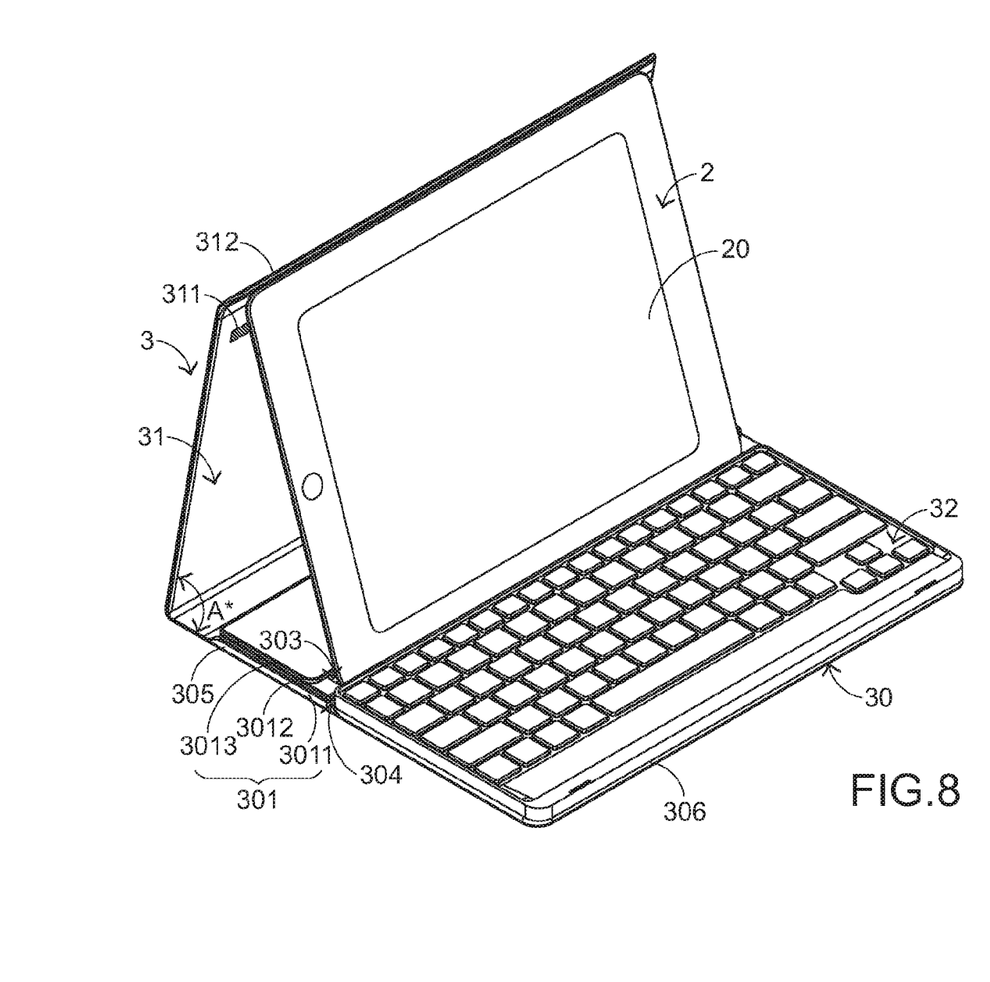
FIG. 8 is a schematic perspective view illustrating a storage device for a tablet personal computer according to an embodiment of the present invention, in which the tablet personal computer is supported by the storage device and a keyboard device is fixed on the storage device.

Please refer to FIG. 7 again. After the keyboard device 32 is fixed in the receiving space 304, the supporting recess 303 is not sheltered by the keyboard device 32. Then, the tablet personal computer 2 is received within the supporting recess 303, and the tablet personal computer 2 is in contact with the upper cover 31. In addition, since the tablet personal computer 2 is magnetically attracted by the third magnetic elements 311 of the upper cover 31, the tablet personal computer 2 is supported by the upper cover (see FIG. 8).

Figure 9:
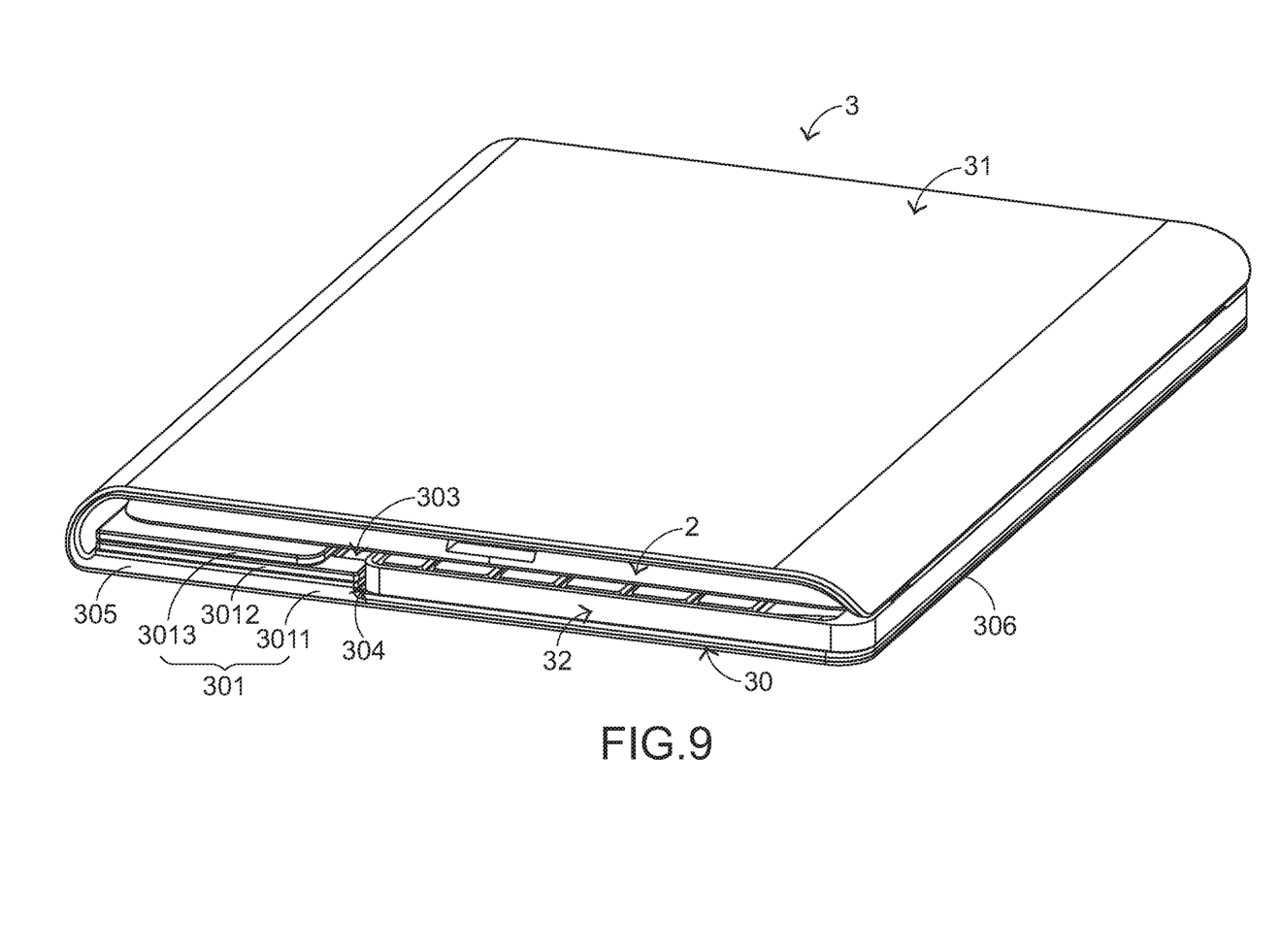
FIG. 9 is a schematic perspective view illustrating a tablet personal computer and a keyboard device stored within the storage device according to an embodiment of the present invention.
Figure 10:
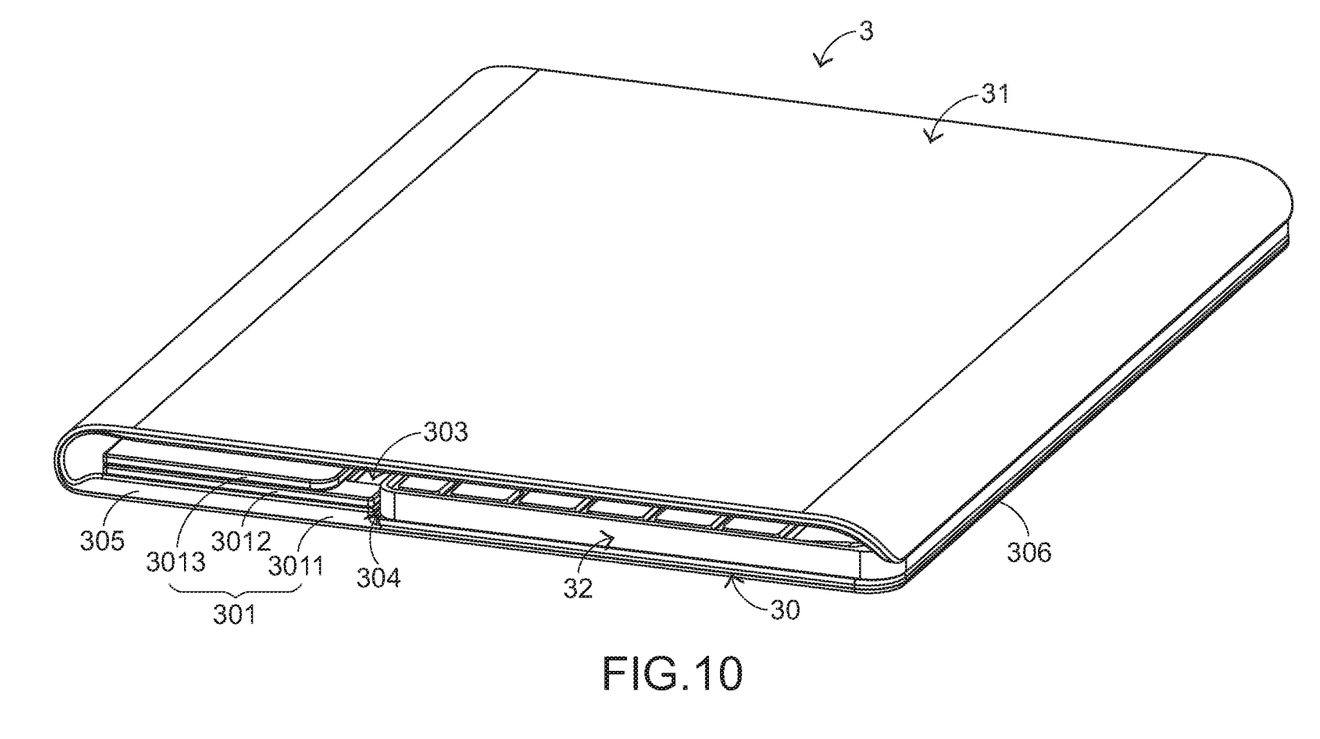
FIG. 10 is a schematic perspective view illustrating a keyboard device stored within the storage device according to an embodiment of the present invention.

In a case that the tablet personal computer 2 is in the non-usage mode and the user wants to store the tablet personal computer 2 and the keyboard device 32, the tablet personal computer 2 is firstly placed on the upper cover 31. Since the tablet personal computer 2 is magnetically attracted by the third magnetic elements 311 of the upper cover 31, the tablet personal computer 2 is fixed on the upper cover 31. The keyboard device 32 is still fixed in the receiving space 304. Then, by closing the upper cover 31, the upper cover 31 is rotated relative to the base 30 to cover the base 30. Consequently, the tablet personal computer 2 and the keyboard device 32 are stored within the storage device 3. Under this circumstance, the storage device 3 is also shaped as a notebook (see FIG. 9). Due to the notebook appearance, the storage device 3 can be easily carried by the user. In some embodiments, the tablet personal computer 2 may be detached from the upper cover 31. Then, by closing the upper cover 31, the upper cover 31 is rotated relative to the base 30 to cover the base 30. Consequently, the keyboard device 32 is stored within the storage device 3. Under this circumstance, the storage device 3 is also shaped as a notebook (see FIG. 10). Due to the notebook appearance, the storage device 3 can be easily carried by the user.

From the above description, the shape of the storage device for the tablet personal computer may be changed by the user according to the practical requirements. When the user wants to operate the tablet personal computer 2, the tablet personal computer 2 is installed on the keyboard device 3 and fixed on the keyboard device 3. In this situation, the user may operate the tablet personal computer 2 in the usual practice. On the other hand, when the user wants to simultaneously carry the tablet personal computer 2 and the keyboard device 32, the tablet personal computer 2 and the keyboard device 32 may be stored within the storage device and the storage device 3 is shaped as a notebook. Due to the slim notebook appearance, the storage device 3 can be easily carried by the user. In other words, the storage device of the present invention is capable of supporting the tablet personal computer and storing the tablet personal computer. Moreover, the storage device of the present invention is capable of storing the keyboard device.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A storage device for supporting a tablet personal computer and storing said tablet personal computer therein, said storage device comprising:
    a base having a foldable structure, which is selectively placed on said base to cover said base or folded and stacked on a first side of said base, wherein when said foldable structure is placed on said base to cover said base, a supporting recess is defined by said foldable structure and said base, wherein when said foldable structure is folded and stacked on said first side of said base, a receiving space is defined by said foldable structure and said base; and
    an upper cover connected with said base and rotatable relative to said base, so that said base is covered by said upper cover or an included angle is defined between said upper cover and said base, wherein when said upper cover is rotated relative to said base and said included angle is defined between said upper cover and said base, said tablet personal computer is permitted to be placed in said supporting recess and supported by said upper cover, wherein when said base is covered by said upper cover, said tablet personal computer is fixed by said upper cover and stored within said storage device.

2. The storage device according to claim 1 wherein said foldable structure comprises:
    a first folding layer fixed on said first side of said base, and having a first notch;
    a second folding layer connected with said first folding layer and foldable relative to said first folding layer, and having a second notch, wherein when said second folding layer is placed on said base, said second notch and said first notch are collectively defined as said supporting recess, and said supporting recess is separated from said receiving space by said second folding layer, wherein when said second folding layer is stacked on said first folding layer and located on said first side of said base, said supporting recess is in communication with said receiving space; and
    a third folding layer connected with said second folding layer and foldable relative to said second folding layer, wherein said third folding layer is selectively placed on said base to cover a second side of said base or stacked on said second folding layer.

3. The storage device according to claim 2 wherein said second folding layer and said third folding layer are integrally formed with said first folding layer.

4. The storage device according to claim 2 wherein said third folding layer comprises a first magnetic element, said first magnetic element is located at a second side of said third folding layer, said base further comprises a second magnetic element, and said second magnetic element is located at said second side of said base, wherein when said first magnetic element and said second magnetic element are magnetically attracted by each other, said third folding layer is fixed on said base.

5. The storage device according to claim 1 wherein said upper cover comprises a third magnetic element, and said third magnetic element is located at a first side of said upper cover, wherein when said tablet personal computer is magnetically attracted by said third magnetic element, said tablet personal computer is fixed on said upper cover.

6. The storage device according to claim 1 wherein a keyboard device is further in communication with said tablet personal computer for inputting at least one symbol or at least one instruction to said tablet personal computer, wherein said keyboard device is permitted to be stored within said receiving space of said base.

7. The storage device according to claim 6 wherein said keyboard device further comprises a fourth magnetic element, and said fourth magnetic element is located at a bottom of said keyboard device, wherein when said fourth magnetic element and a second magnetic element of said base are magnetically attracted by each other, said keyboard device is fixed on said base.

8. The storage device according to claim 6 wherein said keyboard device comprises a second wireless transmission module, wherein when said second wireless transmission module is in communication with said first wireless transmission module, said at least one symbol or said at least one instruction is transmitted from said second wireless transmission module to said first wireless transmission module.

9. The storage device according to claim 8 wherein said first wireless transmission module and said second wireless transmission module are Bluetooth transmission modules.

10. The storage device according to claim 6 wherein when said tablet personal computer is fixed on said upper cover and said base is covered by said foldable structure, said tablet personal computer is permitted to be stored within said storage device, wherein when said foldable structure is folded and stacked on said first side of said base, said keyboard device is permitted to be stored within said receiving space, wherein when said tablet personal computer is fixed on said upper cover and said foldable structure is folded and stacked on said first side of said base, said keyboard device is permitted to be stored within said receiving space and said tablet personal computer is permitted to be stored within said storage device.

\* \* \* \* \*